United States Patent
Jia et al.

(10) Patent No.: US 12,452,947 B2
(45) Date of Patent: Oct. 21, 2025

(54) RETRY MECHANISM FOR ACCESS POINT MULTI-LINK DEVICE

(71) Applicant: HEWLETT PACKARD ENTERPRISE DEVELOPMENT LP, Spring, TX (US)

(72) Inventors: Xuguang Jia, Beijing (CN); Zhenlei Wang, Beijing (CN); Yongchang Guo, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 414 days.

(21) Appl. No.: 18/308,061

(22) Filed: Apr. 27, 2023

(65) Prior Publication Data
US 2024/0365419 A1 Oct. 31, 2024

(51) Int. Cl.
*H04W 76/19* (2018.01)
*H04W 76/15* (2018.01)
*H04W 88/08* (2009.01)

(52) U.S. Cl.
CPC .......... *H04W 76/19* (2018.02); *H04W 76/15* (2018.02); *H04W 88/08* (2013.01)

(58) Field of Classification Search
CPC ..... H04W 76/19; H04W 76/15; H04W 88/08; H04W 52/0245; H04W 76/18; H04W 84/12; H04W 8/30; H04L 1/1867; H04L 1/22; H04L 1/24
See application file for complete search history.

(56) References Cited

U.S. PATENT DOCUMENTS

| | | | |
|---|---|---|---|
| 8,730,960 B2 | 5/2014 | Hart et al. | |
| 10,936,267 B2* | 3/2021 | Suga | H04W 36/362 |
| 11,838,970 B2* | 12/2023 | Sambhwani | H04W 76/16 |
| 2014/0092799 A1* | 4/2014 | Jain | H04W 8/08 |
| | | | 370/311 |
| 2020/0359441 A1* | 11/2020 | Yilmaz | H04W 76/15 |
| 2020/0396568 A1 | 12/2020 | Huang et al. | |
| 2021/0112414 A1 | 4/2021 | Huang et al. | |
| 2021/0112615 A1 | 4/2021 | Huang et al. | |
| 2021/0282210 A1* | 9/2021 | Liu | H04W 52/0235 |
| 2021/0297184 A1 | 9/2021 | Huang et al. | |
| 2021/0315025 A1 | 10/2021 | Seok et al. | |
| 2021/0352722 A1 | 11/2021 | Xin et al. | |
| 2022/0116994 A1 | 4/2022 | Chen et al. | |
| 2022/0182184 A1 | 6/2022 | Wang et al. | |

(Continued)

FOREIGN PATENT DOCUMENTS

WO 2021/141529 A1 7/2021

*Primary Examiner* — Will W Lin
(74) *Attorney, Agent, or Firm* — Hewlett Packard Enterprise Patent Department

(57) ABSTRACT

In implementations of the present disclosure, a retry mechanism for access point multi-link device is provided. An access point (AP) multi-link device (MLD) detects a trigger condition for a retry on a first link. After detecting the trigger condition, the AP MLD further selects a second link from a plurality of links. The AP MLD then selects a retry mode from a plurality of retry modes for the second link, and transmits a retry packet on the second link using the selected retry mode. Implementations of the present disclosure can fully utilize the MLD properties to help speed up the transmissions of the retry frames, and can reduce the channel occupation and increase the channel utilization of the retry frames.

20 Claims, 9 Drawing Sheets

(56) References Cited

U.S. PATENT DOCUMENTS

| | | | |
|---|---|---|---|
| 2023/0046270 A1* | 2/2023 | Huang | H04L 1/22 |
| 2023/0073868 A1* | 3/2023 | Nayak | H04W 74/0816 |
| 2023/0319886 A1* | 10/2023 | Wang | H04L 5/0035 |
| | | | 370/329 |
| 2024/0163866 A1* | 5/2024 | Monajemi | H04W 72/23 |
| 2024/0314860 A1* | 9/2024 | Quan | H04W 8/20 |

* cited by examiner

RETRY MECHANISM FOR ACCESS POINT MULTI-LINK DEVICE

BACKGROUND

In the field of Wi-Fi, retry packets are used when an access point (AP) or a station (STA) does not receive an acknowledgement (ACK), or receive a block ACK from its peer. Over-the-air (OTA) packets with a retry bit set in the frame control field in IEEE 802.11 header can be observed. Lots of retry packets in OTA would lead to a busy air environment. For the worst case, each non-aggregate single user (SU) packet needs to take participate in the contending before being sent out. It might have certain times for retry transmission (TX) requirement, which may be varies by vendors, for one non-acknowledged (ACKed) packet.

Wi-Fi 7 (IEEE 802.11be) is a Wi-Fi standard, which can improve the wireless experience and accelerate emerging use cases. A multi-link operation (MLO) technology uses Wi-Fi technology that enables a station (such as a smartphone) connected to an AP (such as a router) to simultaneously send and/or receive data across different frequency bands and channels. It can help enhance the user experience by handling wireless connections more efficiently. Both the AP and the STA need to support Wi-Fi 7 and MLO so as to use this feature. The MLO enables multi-link devices (MLDs) to connect to all the available Wi-Fi bands at the same time (such as 2.4 GHz, 5 GHZ, and 6 GHZ).

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
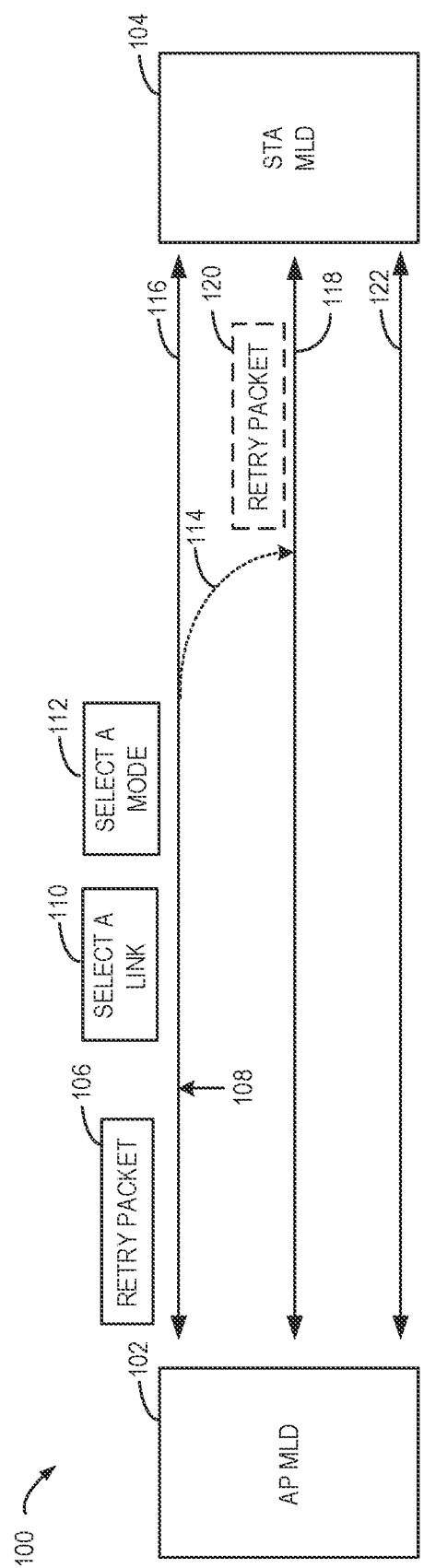
FIG. 1 illustrates an example network environment in which example implementations of the present disclosure may be implemented.

In previous Wi-Fi generations, for example, Wi-Fi 5 and Wi-Fi 6, a device can only connect to one Wi-Fi band at a time, e.g., either the 2.4 GHz band or the 5 GHZ band. Some later products (such as Wi-Fi 6E products) can also connect to the 6 GHz band but can still only connect to one Wi-Fi band at a time. For example, a typical Wi-Fi 6 router operates on 2.4 GHz and 5 GHz bands, but a smartphone can only connect to it using one of the two bands (2.4 GHz or 5 GHZ) at a time. This means that the other one of the two bands will not be used, or the networking speed will be affected by choosing the slower band.

Wi-Fi 7 with the MLO technology can aggregate multiple channels on different frequency bands at the same time, which can negotiate seamless network traffic even if there is interference or congestion. With the MLO, Wi-Fi 7 can establish multiple links between a station or a client (such as a smartphone) and the Wi-Fi network devices (such as an AP or a router). Connecting to the 2.4 GHZ, 5 GHZ, and 6 GHz bands simultaneously can increase the throughput, reduce the latency, and improve reliability. It is ideal for emerging applications like VR/AR, online gaming, remote office, and cloud computing. It is to be understood that both the access point and client device need to support Wi-Fi 7 and MLO to use this feature. Only for the purpose of brevity, an AP, an STA, and a client in the present disclosure hereafter refer to as an MLD which supports the MLO feature if there is no contrary description. For example, an access point hereafter may refer to as an AP MLD, which supports the MLO feature.

Although Wi-Fi 7 with the MLO technology can greatly increase the networking speeds, allow more effective mesh networks, and can provide the very latest interference mitigation techniques to ensure that wireless devices are always connected fast and reliably, even in dense network environments. However, it brings some disadvantages either. For example, there are different retry modes that may be used by different chip vendors. Different vendors may provide configuration knobs for customers to select, and different retry modes may not be suitable for all users' scenarios. Thus, improper retry mode could lead to a bad user experience. Further, there is no new retry mode designed specifically for Wi-Fi 7, and neither for Wi-Fi 7 MLD case. In the MLD usage case, traditional retry mode cannot fulfill the complex requirement for user scenarios.

Therefore, implementations of the present disclosure propose an MLD level retry mechanism. Generally, for the MLD downlink use case, an AP determines whether a trigger condition is satisfied. If the trigger condition is satisfied, the AP will determine which link to switch, and then the AP will determine which retry mode will be used for scheduling the retry frame. For the MLD uplink use case, the AP will proactively obtain the status of the link to determine whether there is an incoming packet blocked, and the other steps are analogous to the downlink use case.

According to implementations of the present disclosure, an AP MLD detects a trigger condition for a retry on a first link. The AP MLD selects a second link from a plurality of links based on channel utilizations of the links, power save (PS) statuses of the links, and frame retry rates of the links. The AP MLD then selects a retry mode from a plurality of retry modes for the second link based on at least one of a received signal strength indicator (RSSI), a channel utilization, a packet length, a historical retry mode, and a total number of retries. The AP MLD transmits a retry packet on the second link using the selected retry mode.

As an example, if the AP MLD detects a trigger condition that the maximum number of retries reaches up to a limit number, then the AP MLD may decide to switch to another link for retry. The AP MLD may select the second link based on the channel utilizations, and the frame retry rates, and so on. After selecting the second link, the AP MLD may select a retry mode based on the RSSI, or the channel utilization, etc. After the second link and the retry mode have been determined, the AP MLD may start to schedule a retry packet on the second link using the selected retry mode. In this manner, the retry mechanism for AP MLD can speed up retry frame transfer and increase the channel utilization. Unlike traditional retry modes limited to a single link, which cannot cover multiple link transfer, the MLD can provide more flexible ways to retry data frames transmissions, and thus corresponding retry method is proposed.

For a single link retry mode, it may try to send frames to an STA and repeat the retry process many times. Usually, retry frames or request to send (RTS) frames may be sent dozens of times, which largely increases channel utilization. On the contrary, implementations of the present disclosure provide an MLD level retry mechanism to help an AP send retry frames more efficiently than what a single link has done. The implementations of the present disclosure use more flexible ways to try to schedule retry frames on multiple links than on a single link. Thus, retry frames will not be sent many times anymore. This new retry mechanism can fully utilize the MLD properties to help speed up retry frames transmissions. It can reduce the channel occupation and increase the channel utilization of the retry frame.

The advantages of implementations of the present disclosure will be described with reference to example implementations as described below. Reference is made below to FIG. 1 through FIG. 8 to illustrate basic principles and several example implementations of the present disclosure herein.

Reference is made to FIG. 1, which illustrates an example network environment 100 in which example implementations of the present disclosure may be implemented. As shown in FIG. 1, the network environment 100 comprises an AP MLD 102 and a station multi-link device (STA MLD) 104. The AP MLD 102 may operate on the 2.4 GHz band. The AP MLD 102 may further operate on the 5 GHz band and the 6 GHz band. The STA MLD 104 may operate on the 2.4 GHz band. The STA MLD 104 may further operate on the 5 GHz band and the 6 GHz band.

The network environment 100 further comprises three links between the AP MLD 102 and the STA MLD 104. These three links may include a link 116, a link 118 and a link 122, as shown in FIG. 1. In some example implementations, the link 116 may be referred to a link on 2.4 GHz band, the link 118 may be referred to a link on 5 GHz band, and link 122 may be referred to a link on 6 GHz band. However, it is to be understood that the order of the links is not limited to what they are shown in FIG. 1.

The network environment 100 further comprises a retry packet 106. The retry packet 106 may be transmitted on the link 116. According to implementations of the present disclosure, the AP MLD 102 may detect a trigger condition 108. If the AP MLD 102 detects the trigger condition 108, the AP MLD 102 may decide to switch to another link for a retry transmission. For example, the AP MLD 102 may select (110) the link 118 among the links 118 and 122. For another example, the AP MLD 102 may select (110) the link 122 among the links 118 and 122. The selection 110 may be based on power save mode, channel utilization, and frame retry rate of respective links. For example, the AP MLD 102 may select the link 118 based on channel utilizations of the links 118 and 122, PS statuses of the links 118 and 122, and frame retry rates of the links 118 and 122. In some example implementations, the selection 110 may be based on a combination of any of the three elements.

On this basis, if the AP MLD 102 selects the link 118, then after selecting the link 118, the AP MLD 102 may select (112) a retry mode out of four retry modes. The selection 112 may be based on at least one of an RSSI, a channel utilization, a packet length, a historical retry mode, and a total number of retries. For example, the AP MLD 102 may select a third retry out of the four retry modes. After the AP MLD 102 selects (112) the third retry mode, the AP MLD 102 may start to schedule (114) a retry packet 120 on the link 118 using the third retry mode.

It is to be understood that in FIG. 1 and throughout the present disclosure, the number of any elements is only for the purpose of illustration without suggesting any limitations. The network environment 100 may comprise more or fewer links, and the AP MLD 102 and the STA MLD 104 may support more links as Wi-Fi technology develops in the future.

Figure 2:
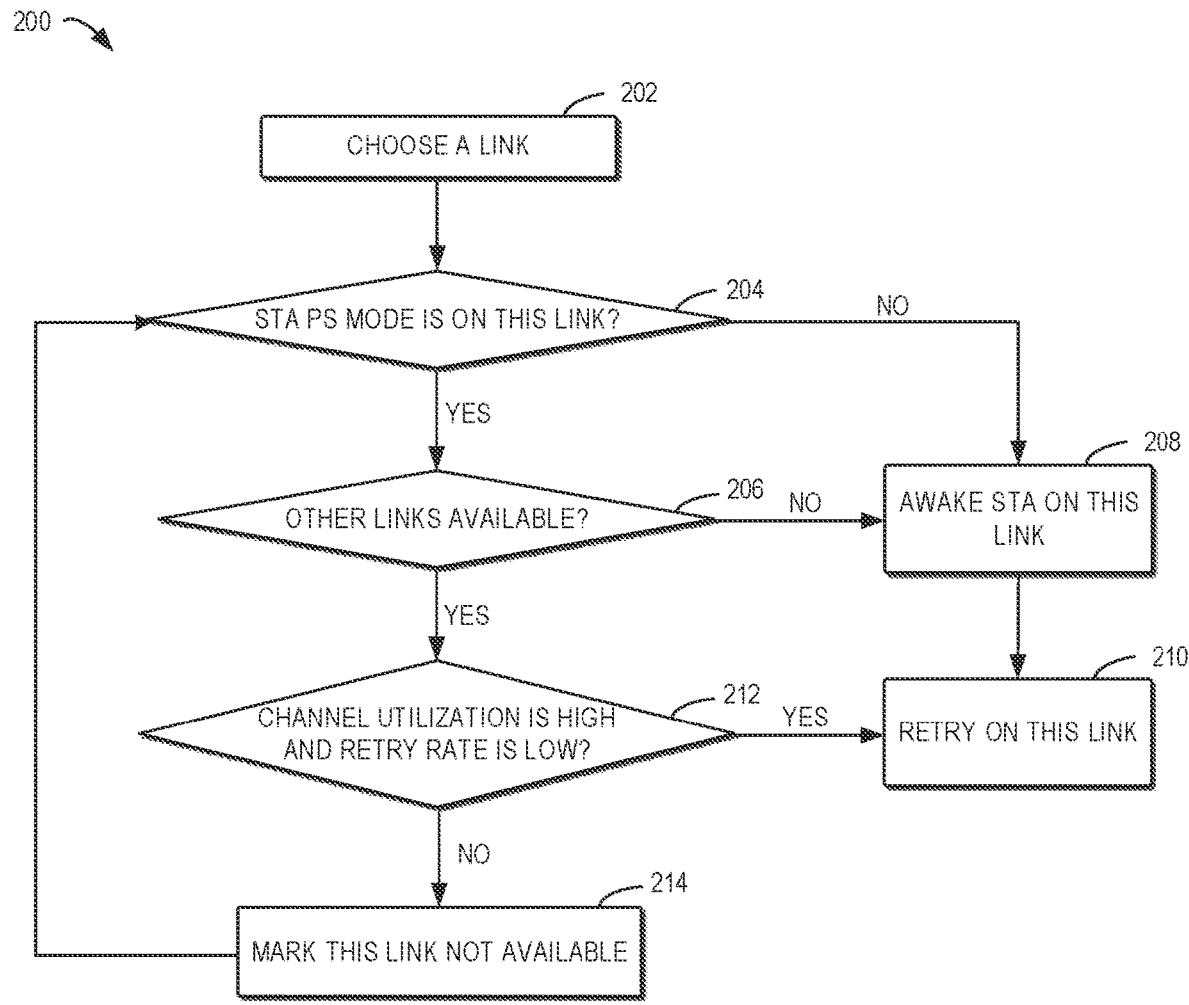
FIG. 2 illustrates an example flow chart of an example process for choosing a new link for a non-aggregate MLD case according to implementations of the present disclosure.

The selection 110 will be described in detail with FIGS. 1 and 2. FIG. 2 illustrates an example flow chart of an example process 200 for choosing a new link for a non-aggregate MLD case according to implementations of the present disclosure. Reference will be made in combination with FIG. 1.

For an MLD DL case, it may try to send the same retry frame on other link(s) with a proper retry mode. For an MLD UL case, detection of the retry mode on the links should be done first, and then the AP may choose a proper link to perform a transmission opportunity sharing (TXS), and a traffic identifier (TID)-to-link mapping may also need to advance the traffic to go through a proper link if needed. Process 200 shows when to trigger the link selection and which link should be used to perform the retry transmission. Regarding the TXS, it will be described with reference to FIG. 4.

In some example implementations, trigger conditions for the retry procedure on MLD links may be detected. In some example implementations, the trigger condition may comprise that if the current link had aware the retry possibility is not at a normal level. For example, the TX data packet's transmission opportunity (TXOP) requirement does not fit for scan off-channel, restricts target wake time (TWT), some emergency traffic (NESP, or high priority), etc., and that means the AP may concern current traffic to the STA is not guaranteed. In some example implementations, the trigger condition may comprise that the certain retry mode procedure only happened on a small amount of MLD clients or MLD links. In some example implementations, the trigger condition may comprise that a retry counter reached one specific threshold value that is predefined.

If the trigger condition is detected, at block 202, the AP MLD 102 may choose a link to switch. There may be three dimensions that need to be considered. One dimension may be channel utilizations, and another one may be the client's PS status, and yet another one may be a frame retry rate. As an example, the current link may be the link 116, and the trigger condition is detected for the link 116. In this case, the AP MLD 102 may choose another link, such as the link 118 or the link 122 as shown in FIG. 1.

At block 204, the STA PS mode of an MLD client on the chosen link may be checked. For example, if the link 118 is chosen, then the PS mode of the STA on the link 118 may be checked. If the power save mode of the MLD client is on, then the link 118 should not be the first considered link to perform retry. Otherwise, the process 200 may continue to block 208. Consequently, if the power save mode of the MLD client on the link 118 is on, then the AP MLD 102 may continue to block 206 to choose another link (such as the link 122) and check if the power save mode of the MLD client on the link 122 is on.

If the PS modes of the MLD client on the links 118 and 122 are off, then the process 200 may continue to block 212. If the PS modes of the MLD client on the link or 122 are on, then the process 200 may continue to block 208. At block 208, the AP MLD 102 may wake up the STA with a delivery traffic indication message (DTIM) or traffic indication message indicated in beacon frames. For example, in the case that the PS mode of the STA on the link 118 is on, the process 200 may wake up the STA on the link 118.

At block 212, the AP MLD 102 may choose the 'freest' and lowest TX retry rate link to perform retry transmission. Assuming both the PS modes of STAs links 118 and 122 are off, the AP MLD 102 may check the channel utilizations and frame retry rates of the links 118 and 122. At block 212, the AP MLD 102 may mark a link with high channel utilization and/or low frame retry rate as the link to switch. If this link has a low channel utilization or a high frame retry rate, then the process 200 may continue to block 214. If this link has a high channel utilization and/or a low frame retry rate, then the process 200 may continue to block 210. For example, the link 122 may have a high channel utilization and a low frame retry rate, then the link 122 may be selected to be the link to switch.

At block 210, the AP MLD 102 may transmit the retry packet on this link. For example, the AP MLD 102 may transmit retry packet on the link 122. At block 214, the AP MLD 102 may mark this link as not available and go back to block 204. For example, the AP MLD 102 may mark the link 118 as not available, and the AP MLD 102 may go back to block 204 to check other links.

Figure 3A:
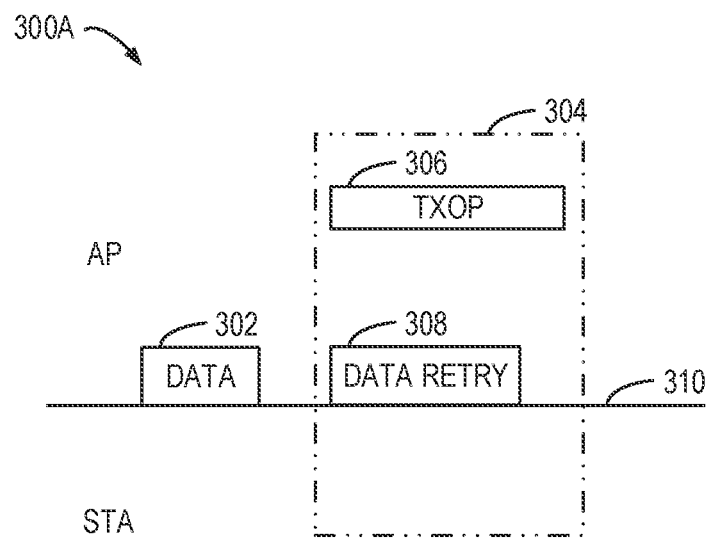
FIG. 3A illustrates an example illustration of a first retry mode for an AP downlink (DL) non-aggregate single link case related to some implementations of the present disclosure.

The selection 112 will be described in detail with FIGS. 3A-3D. FIG. 3A illustrates an example illustration 300A of a first retry mode for an AP DL non-aggregate single link case related to some implementations of the present disclosure. Reference will be made in combination with FIG. 1.

As shown in FIG. 3A, a line 310 is used to distinguish actions of the AP MLD 102 and actions of the STA MLD 104. The data 302 may be transmitted from the AP MLD 102 to the STA MLD 104. There may be some trouble in sending data frames; for example, traffic congestion may occur, which may result in a blockage of data frames. In the case that it is allowed to occupy the air resource without peer ACKed, the AP MLD 102 may decide to perform the retry transmission using the first retry mode.

As shown in dashed block 304, which shows details of the first retry mode. The AP MLD 102 may gain a TXOP 306. A TXOP means a network allocation vector (NAV) time updated by the former TX packets. The TXOP is used to make sure that the traffic flow is undisturbed.

Within the time of TXOP 306, a data retry frame 308 may be transmitted directly. For the first retry mode, usually, a data frame that uses a high TX rate will more easily fail compared with using a low TX rate. If a first retry data frame is failed, it may be hard to predict whether and when the retry transmissions will succeed.

Figure 3B:
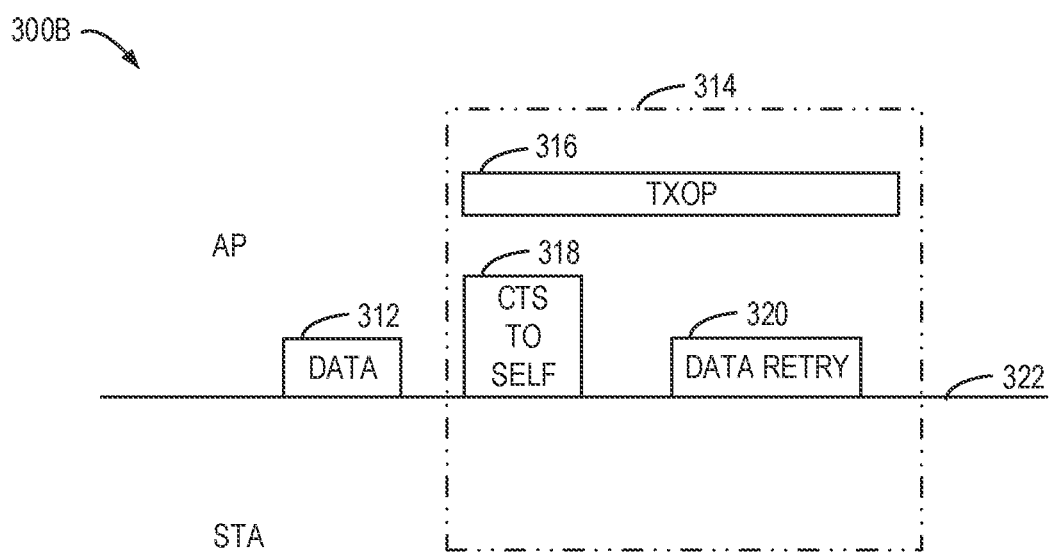
FIG. 3B illustrates an example illustration of a second retry mode for an AP DL non-aggregate single link case related to some implementations of the present disclosure.

Reference is made to FIG. 3B, which illustrates an example illustration 300B of a second retry mode for an AP DL non-aggregate single link case related to some implementations of the present disclosure. Reference will be made in combination with FIG. 1.

As shown in FIG. 3B, a line 322 is used to distinguish actions of the AP MLD 102 and actions of the STA MLD 104. The data 312 may be transmitted from the AP MLD 102 to the STA MLD 104. Similar to FIG. 3A, there may be some trouble in sending data frames. In that, it is allowed to occupy the air resource without peer ACKed, and in the case of long-distance transmission, the AP MLD 102 may decide to perform the retry transmission using the second retry mode.

As shown in dashed block 314, which shows details of the second retry mode. The AP MLD 102 may gain a TXOP 316. Within the time of TXOP 316, a clear to send (CTS) frame 318 may be transmitted to the AP MLD 102 itself. The CTS frame 318 indicates that the channel shall be cleared. Then a data retry frame 320 may be transmitted.

For the second retry mode, it may directly take the channel and then followed with a data frame retry. The second retry mode may help clean the channel, but if the former data frame failed because of collision, this retry might increase the channel congestion and waste one TXOP.

Figure 3C:
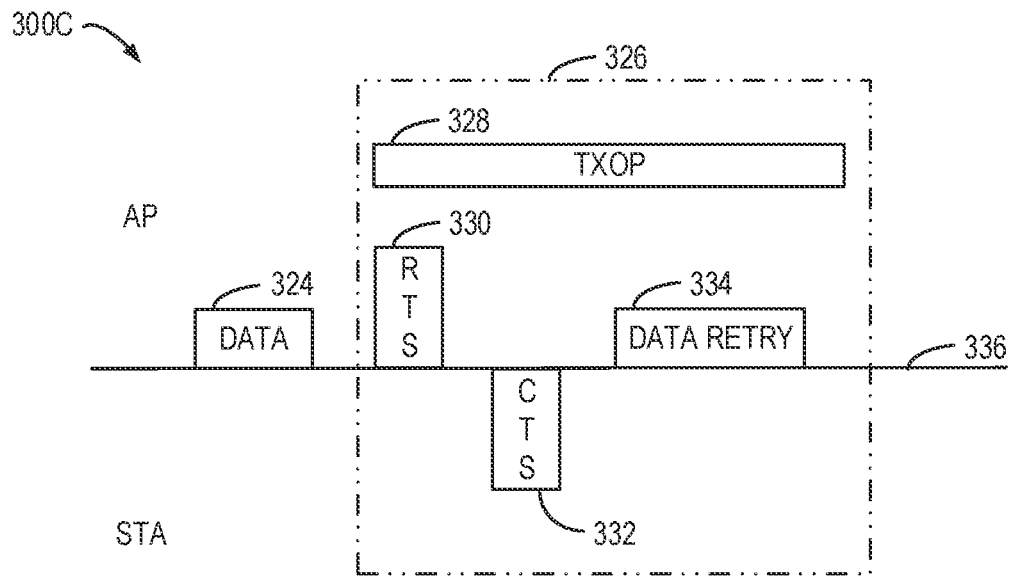
FIG. 3C illustrates an example illustration of a third retry mode for an AP DL non-aggregate single link case related to some implementations of the present disclosure.

Reference is made to FIG. 3C, which illustrates an example illustration 300C of a third retry mode for an AP DL non-aggregate single link case related to some implementations of the present disclosure. Reference will be made in combination with FIG. 1.

As shown in FIG. 3C, a line 336 is used to distinguish actions of the AP MLD 102 and actions of the STA MLD 104. The data 324 may be transmitted from the AP MLD 102 to the STA MLD 104. Similar to FIGS. 3A and 3B, there may be some trouble in sending data frames. In this case, the AP MLD 102 may decide to perform the retry transmission using the third retry mode.

As shown in dashed block 326, which shows details of the third retry mode. The AP MLD 102 may gain a TXOP 328. Within the time of TXOP 328, an RTS frame 330 may be sent to the STA MLD 104. The STA MLD 104 may send a CTS frame 332 to the AP MLD 102. The CTS frame 332 indicates that the channel shall be cleared. After the clearance of the channel, a data retry frame 334 may be transmitted.

Figure 3D:
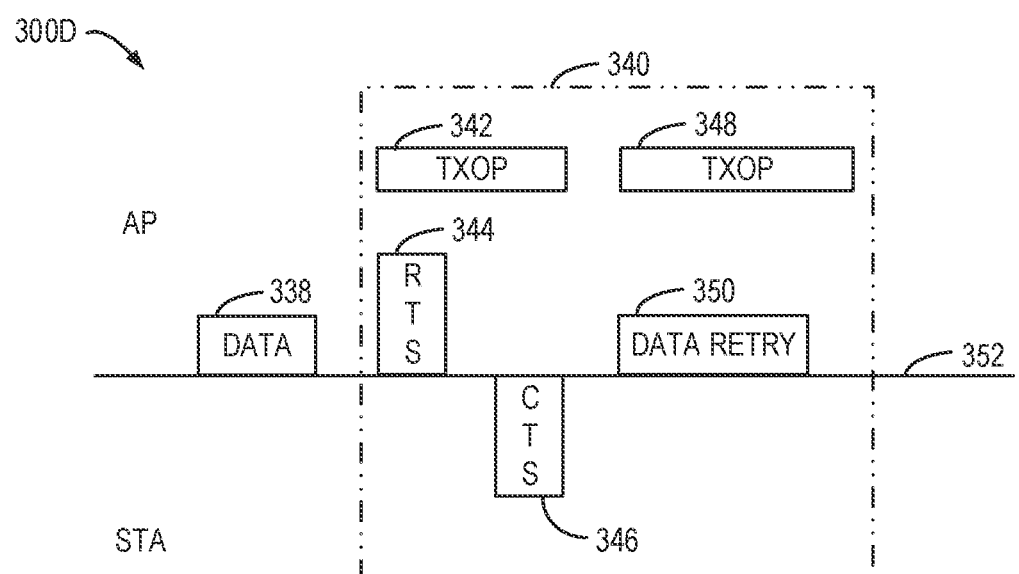
FIG. 3D illustrates an example illustration of a fourth retry mode for an AP DL non-aggregate single link case related to some implementations of the present disclosure.

For the third retry mode, once the AP MLD 102 obtains the CTS frame 332, then the AP MLD 102 may perform data frame retry transmissions. The third retry mode is mostly chosen by vendors. In the third mode, the RTS 330 may be sent with the basic rate, and it may be short. The third retry mode may introduce the lowest impact on the channel. A disadvantage may be that it may waste the TXOP 228 once it does not get the RTS 330. In the case that peer responses are needed with CTS, the AP MLD 102 may decide to perform the retry transmission using the third retry mode. Reference is made to FIG. 3D, which illustrates an example illustration 300D of a fourth retry mode for an AP DL non-aggregate single link case related to some implementations of the present disclosure. Reference will be made in combination with FIG. 1.

As shown in FIG. 3D, a line 352 is used to distinguish actions of the AP MLD 102 and actions of the STA MLD 104. The data 338 may be transmitted from the AP MLD 102 to the STA MLD 104. Similar to FIGS. 3A, 3B, and 3C, there may be some trouble in sending data frames. In this case, the AP MLD 102 may decide to perform the retry transmission using the fourth retry mode.

As shown in dashed block 326, which shows details of the fourth retry mode. The AP MLD 102 may gain a TXOP 342. Within the time of TXOP 342, an RTS 344 may be sent to the STA MLD 104. The STA MLD 104 may send a CTS frame 346 to the AP MLD 102. The CTS frame 346 indicates that the channel shall be cleared. After the channel being cleared, the AP MLD 102 may further gain a TXOP 248. Within the time of the TXOP 348, a data retry frame 350 may be transmitted.

For the fourth retry mode, in the TXOP 242, the retry data frame 350 will not be transmitted, and the TXOP 348, retry data frame 350 will be transmitted. Thus, it is more flexible but less effective. If a client (such as the STA MLD 104) replies to a CTS frame, then data frames may need to contend with the channel again. However, the fourth retry mode may introduce some delay. In the case that peer responses are needed with CTS and in the case that there is no CTS response from a peer, the AP MLD 102 may decide to perform the retry transmission using the fourth retry mode.

According to implementations of the present disclosure, different retry modes may be selected and used in different scenarios, for example, the first retry mode and the second retry mode may occupy the air resource without peer ACKed, which can save time. They are suggested to be used behind the successful TX packets, which get correct ACKed, and can also be used for long-distance transmission, etc. For the third retry mode and the fourth retry mode, peer responses are needed with CTS, which can make sure that the client peer is responsive. They are suggested to be used as a normal retry procedure to protect retry flow, and TX data will not exist if there is no CTS response from a peer.

In some example implementations, a function is introduced to help to select a suitable retry mode. The function (1) may be as follows:

$$F_{retry-mode-selection}(\text{input parameters}) \quad (1)$$

where the $F_{retry-mode-selection}$ represents the function (1) for helping select the suitable retry mode for a link. In some example implementations, the input parameters may include an RSSI. In some example implementations, it may further use an RSSI value in the latest packet. In some example implementations, it may further use an average RSSI value. In some example implementations, it may further use the maximum and/or the minimum RSSI value.

In some example implementations, the input parameters may include the channel utilization of the link. In some example implementations, the input parameters may include a packet length. For example, a longer frame means it may need more TXOP time. In some example implementations, the input parameters may include counters array or history array for different retry modes. This array may record what kind of retry mode has ever been used and how many times each retry mode has been used. In some example implementations, the input parameters may include a limit on the total number of retries. This limit may be a limitation of the maximum retries numbers that are set by the vendor or client. Once the limit is reached, the retry frame will be discarded. In some example implementations, the input parameters may include a combination of any of the above items.

In some example implementations, the function (1) may be implemented by a trained machine learning model. In some example implementations, the machine learning model may be a neural network trained with a training dataset associated with the characteristics of the links and information on retry transmissions of the links. In some example implementations, the training dataset may comprise historical RSSIs for a period of time. In some example implementations, the training dataset may further comprise historical channels utilizations for the period of time. In some example implementations, the training dataset may further comprise historical packets lengths for the period of time. In some example implementations, the training dataset may further comprise historical retries modes for the period of time. In some example implementations, the training dataset may further comprise historical total numbers of retries for the period of time. In some example implementations, training dataset may comprise a combination of any of the above elements.

In some example implementations, the maximum retry attempt may be represented as $RA_{MAX}$, and the retry attempts may stop if a retry counter reaches the $RA_{MAX}$. The function (1) will be recalled if the current TX packet (including start, middle, end positions) have not been acknowledged and a new retry mode will be selected. In some example implementations, a TXOP gained by each retry mode needs to consider the short inter-frame space (SIFS) and ACK frame time. In some example implementations, for high utilization air condition, it might reserve more time for multiple retry frames.

Figure 4:
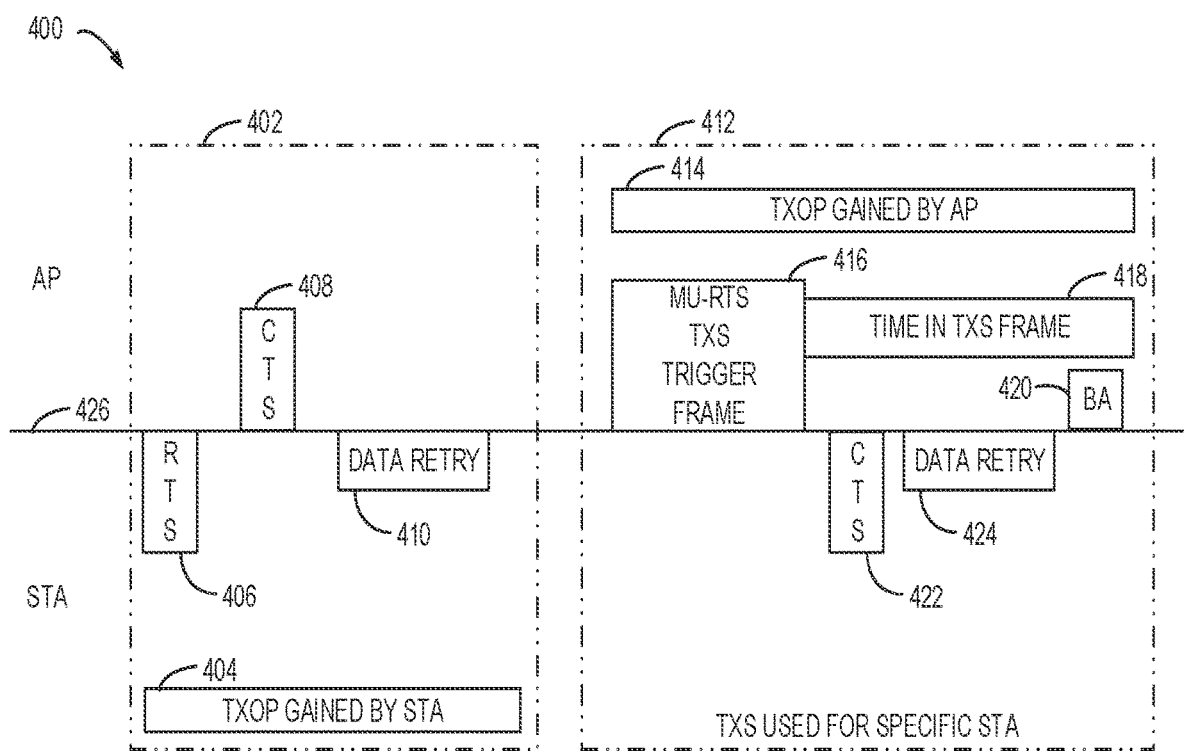
FIG. 4 illustrates an example illustration of a transmission opportunity sharing for an AP uplink (UL) non-aggregate single link case according to implementations of the present disclosure.

Reference is made to FIG. 4, which illustrates an example illustration 400 of a transmission opportunity sharing for an AP UL non-aggregate single link case according to implementations of the present disclosure. Reference will be made in combination with FIG. 1. In FIG. 4, the AP MLD 102 may not be aware of a UL retry action until it hears the packet. Thus, it may need some actions on the STA MLD 104 to make sure that the proper retry mode to be used for the traffic which is from the STA MLD 104 to the AP MLD 102. Therefore, it can perform a transmission opportunity sharing (TXS) for the potential retry behavior for a specific Wi-Fi 7 client.

In some example implementations, a TXS procedure may allow an AP to allocate a portion of the time within an obtained TXOP to only an associated STA (such as an 802.11be ETH STA) for transmitting one or more non-TB presentation protocol data units (PPDUs). This can be used to help the specific client to have more chances to gain the air opportunity to perform UL with the AP.

As shown in FIG. 4, a line 426 is used to distinguish the actions of the AP MLD 102 and the actions of the STA MLD 104. As shown in dashed block 402, and only for the purpose of illustration, the third retry mode may be detected. The STA MLD 104 may gain a TXOP 404. Within the time of TXOP 404, an RTS frame 406 may be sent to the AP MLD 102. The AP MLD 102 may send a CTS frame 408 to the STA MLD 104. The CTS frame 408 indicates that the channel shall be cleared. After the clearance of the channel, a data retry frame 410 may be transmitted.

As an example, assuming that the AP MLD 102 failed to receive the retry packet sent to it, it may be aware of the different retry modes from clients. For example, in the third retry mode, clients may gain the TXOP 404 for it to retry data packets, and the RTS 406 may update the NAV with a time that is longer than the time duration used by itself. RTS frames may be failed to hear the data retry packets. This may also be ignored if an AP deals with the UL trigger traffic only or already knows the UL buffer status.

As shown in dashed block 412, after the detection of the third retry mode, the AP MLD 102 may try to use the TXS for the STA MLD 104 because the STA MLD 104 may need more transmission opportunities. The AP MLD 102 may gain a TXOP 414, and allocate time period 418 within the TXOP 414 to the STA MLD 104 by sending out a multi-user request to send (MU-RTS) TXS trigger frame 416 to the STA MLD 104. The STA MLD 104 may use the time period 418 allocated to the STA MLD 104 by the AP 102 to perform retry packet transmissions. For example, the STA MLD 104 may send a CTS frame 422 and may clear the channel. Then the STA MLD 104 may transmit data retry frame 424. The AP MLD 102 may send block acknowledgment (BA) 420.

Figure 5:
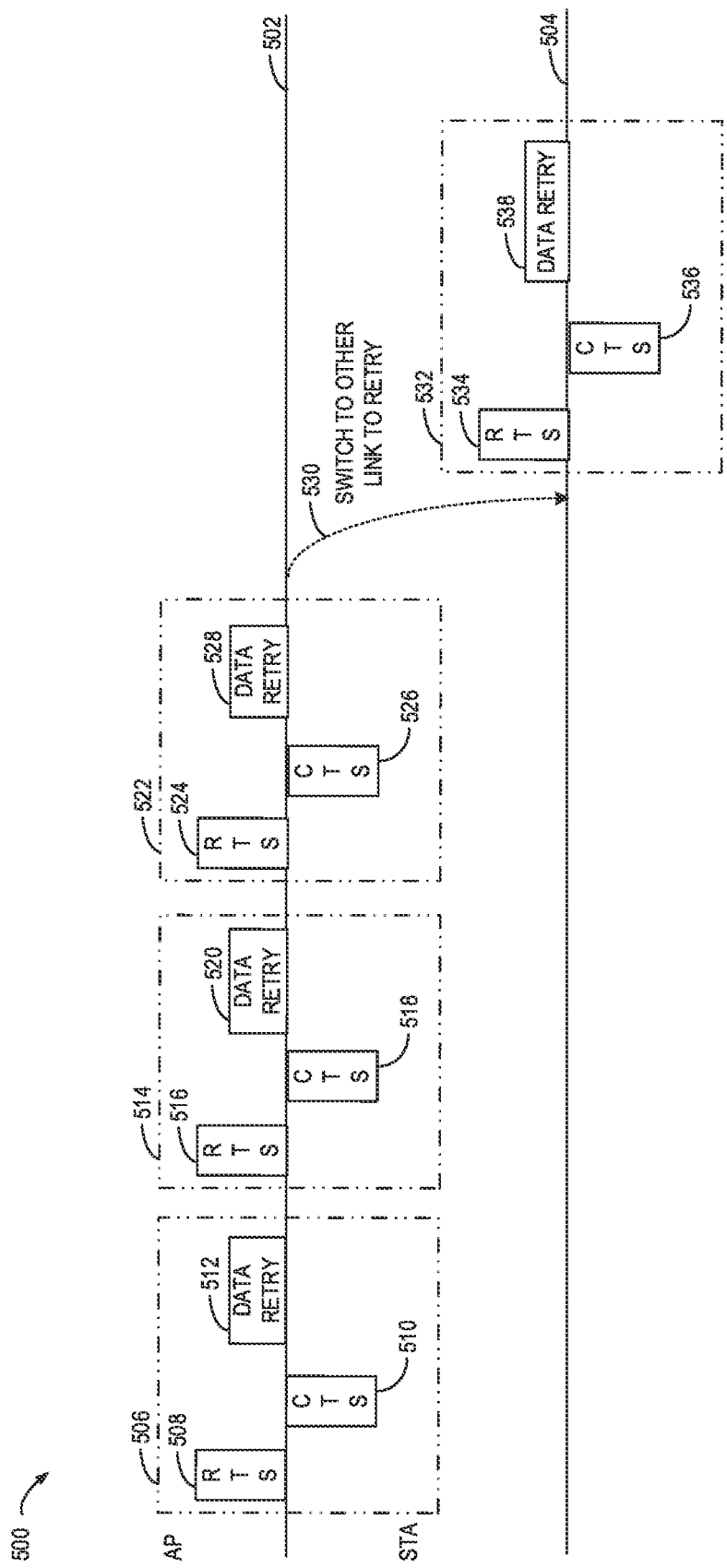
FIG. 5 illustrates an example illustration of switching to another link to retry according to implementations of the present disclosure.

Reference is made to FIG. 5, which illustrates an example illustration 500 of switching to the other link to retry according to implementations of the present disclosure. Reference will be made in combination with FIG. 1. FIG. 5 describes an example of switching to the other link for an MLD DL case. One threshold value for the times that may need to perform such retry transmission on a new link, see the below condition (2):

$$0 \leq j \leq RA\_THR_{link\ i} \leq RA_{MAX} \quad (2)$$

where j may represent the retry counter on the current link, and i may represent the new link, and $RA_{MAX}$ may represent the maximum retry attempt, and $RA\_THR_{link\ i}$ may represent the retry attempts threshold to switch to the link i. For example, j may be an MLD level value, and if the retry attempts reach $RA\_THR_{link\ i}$, then the AP MLD 102 may try the retry procedure on new link i.

In some example implementations, a retry attempt threshold may be different for different links, and for the retry mode selection on a new link, the AP MLD 102 may use the below function (3) to ensure the proper retry mode selected with the input parameters from this new link:

$$F_{retry-mode-selection}(\text{input parameters from link } i) \quad (3)$$

where the $F_{retry-mode-selection}$ may represent the function (1) for helping select the suitable retry mode for a link as described above, and input parameters from link i may represent the input parameters for the link i to which the new link is to be switched. As shown in FIG. 5, a link 502 may be a link on which the current retry transmission being performed. As shown in dashed block 506, an RTS frame 508 may be transmitted to the STA MLD 104. A CTS frame 510 may be transmitted by the STA MLD 104. The STA MLD 104 may clear the channel. A data retry frame 512 may be transmitted. The dashed block 506 may show the first time for the retry transmission.

As shown in dashed block 514, an RTS frame 516 may be transmitted to the STA MLD 104. A CTS frame 518 may be transmitted by the STA MLD 104. The STA MLD 104 may clear the channel. A data retry frame 520 may be transmitted. A data retry frame 520 may be transmitted. The dashed block 514 may show the second time for the retry transmission. As shown in dashed block 522, an RTS frame 524 may be transmitted to the STA MLD 104. A CTS frame 526 may be transmitted by the STA MLD 104. The STA MLD 104 may clear the channel. A data retry frame 528 may be transmitted. A data retry frame 528 may be transmitted. The dashed block 522 may show the n-th time for the retry transmission, where n may represent an integer.

Assuming the n reaches the $RA\_THR_{link\ i}$, it means the AP MLD 102 is going to switch from the link 502 to a link 504. Therefore, at 530, the AP MLD 102 may switch to the link 504 to perform the retry transmission. As shown in dashed block 532, an RTS frame 534 may be transmitted to the STA MLD 104. A CTS frame 536 may be transmitted by the STA MLD 104. The STA MLD 104 may clear the channel. A data retry frame 538 may be transmitted. A data retry frame 538 may be transmitted.

Figure 6:
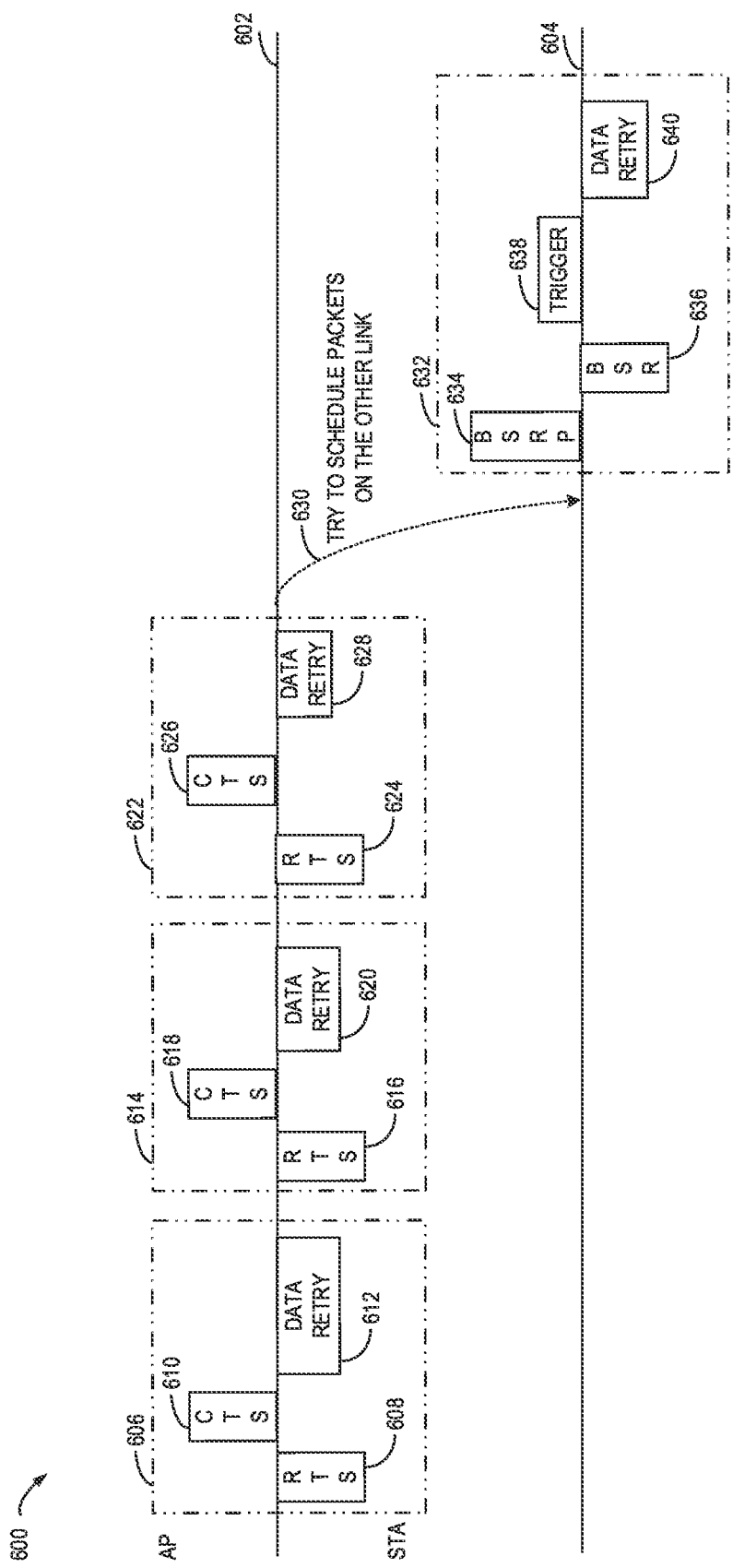
FIG. 6 illustrates an example illustration of scheduling packets on a new link according to implementations of the present disclosure.

Reference is made to FIG. 6, which illustrates an example illustration 600 of scheduling packets on the other link according to implementations of the present disclosure. Reference will be made in combination with FIG. 1.

FIG. 6 describes an example of scheduling packets on the other link for an MLD UL case. As shown in FIG. 6, an uplink 602 may be a link on which the current retry transmission being performed. As shown in dashed block 606, an RTS frame 608 may be transmitted to the AP MLD 102. A CTS frame 610 may be transmitted by the AP MLD 102. The AP MLD 102 may clear the channel. A data retry frame 612 may be transmitted. The dashed block 606 may show the first time for the retry transmission on the uplink 602.

As shown in dashed block 614, an RTS frame 616 may be transmitted to the AP MLD 102. A CTS frame 618 may be transmitted by the AP MLD 102. The AP MLD 102 may clear the channel. A data retry frame 620 may be transmitted. The dashed block 614 may show the second time for the retry transmission on the uplink 602. As shown in dashed block 622, an RTS frame 624 may be transmitted to the AP MLD 102. A CTS frame 626 may be transmitted by the AP MLD 102. The AP MLD 102 may clear the channel. A data retry frame 628 may be transmitted. The dashed block 622 may show the n-th time for the retry transmission on the uplink 602, where n may represent an integer.

Assuming the n reaches the $RA\_THR_{link\ i}$, it means the AP MLD 102 is going to switch from the link 602 to a link 604. Therefore, at 630, the AP MLD 102 may try to schedule packets on an uplink 604. In some implementations, there is a need to add one more condition to proactively understand the status of the client upstream packet buffer. Thus, it needs a buffer status report poll (BRSP) procedure (triggered by AP) or an implicit STA buffer status by checking the quality of service (QOS) filed from a UL Data packet (reported by STA).

As an example shown in dashed block 632, a BRSP frame 634 may be transmitted to the STA MLD 104, and a buffer status report (BSR) frame 636 may be transmitted to the AP MLD 102. The AP MLD 102 may trigger (638) the retry transmission procedure. A data retry frame 640 may be transmitted. In some example implementations, for an aggregate case, multi-frames may be packeted into the same A-mac protocol data unit (AMPDU), and the specific un-ACKed packet could be added in the next AMPDU frame. In some example implementations, if AMPDUs (all packets) are without BA frames, it means all the packets in the same PPDU failed, and this problem degenerates into cases as discussed in FIG. 6, then the proposed retry mechanism is still suitable. In some example implementations, for an MLD case, the same sequence number (SN) data packet may perform duplicated transmission on different links, and assemble into different AMPDU frames on different links.

Figure 7:
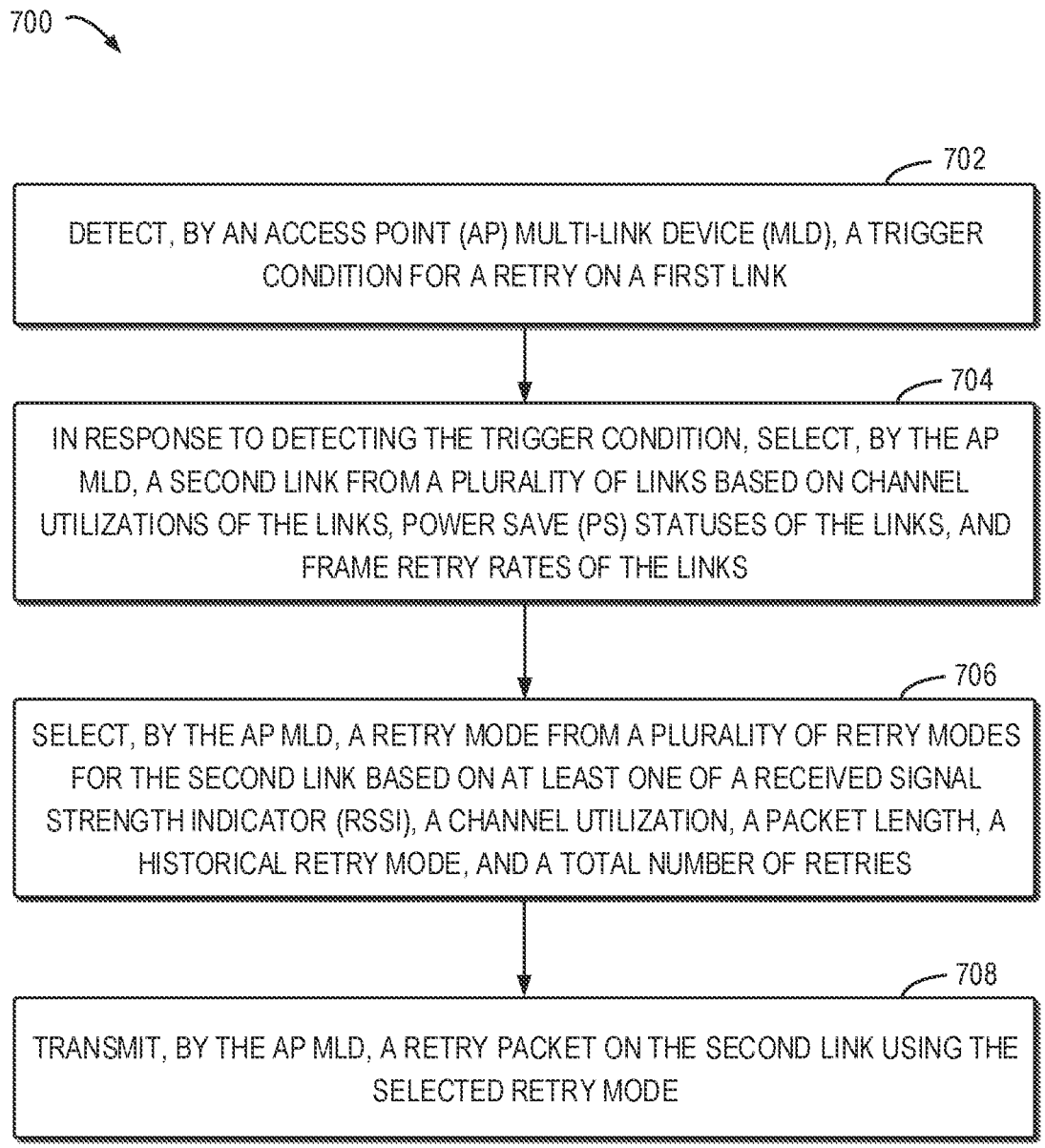
FIG. 7 illustrates an example flow chart of an example method for retry transmission according to implementations of the present disclosure.

Reference is made to FIG. 7, which illustrates an example flow chart of an example method 700 for retry transmission according to implementations of the present disclosure, and the method 700 may be performed by an access point such as the AP MLD 102. For clarity, reference will be made in combination with FIG. 1.

At 702, the AP MLD detects a trigger condition for a retry on a first link. As an example, the AP MLD 102 may detect trigger event 108 for a retry on the link 116. At 704, if the AP MLD detects the trigger condition 108, the AP MLD 102 selects a second link from a plurality of links based on channel utilizations of the links, PS statuses of the links, and frame retry rates of the links. As an example, the AP MLD 102 may select the link 118 from the links 118 and 122. The details of the selection of the second link are described with reference to FIG. 2. For brevity, the details of the selection of the second link will not be discussed herein.

At 706, the AP MLD selects a retry mode from a plurality of retry modes for the second link based on at least one of an RSSI, a channel utilization, a packet length, a historical retry mode, and a total number of retries. As an example, the AP MLD 102 may select the third retry mode from the first, the second, the third, and the fourth retry modes as described in FIGS. 3A-3D. For brevity, the details of the selection of the retry mode for the second link will not be discussed herein.

At 708, the AP MLD transmits a retry packet on the second link using the selected retry mode. As an example, the AP MLD 102 may transmit a retry packet on the link 118 using the third retry mode. The details of the transmissions of the retry packet on the second link using the selected retry mode are described with reference to FIGS. 5 and 6. For brevity, the details of the transmissions of the retry packet on the second link using the selected retry mode will not be discussed herein.

According to implementations of the present disclosure, an AP MLD can fully utilize the MLD properties to help speed up the transmissions of the retry frames. As one of the advantages, the AP MLD can enable the reduction of the channel occupation and the increase of the retry frame's channel utilization. Moreover, the AP MLD can provide more flexible ways to retry data frames transmissions and can send retry frames more efficiently.

Figure 8:
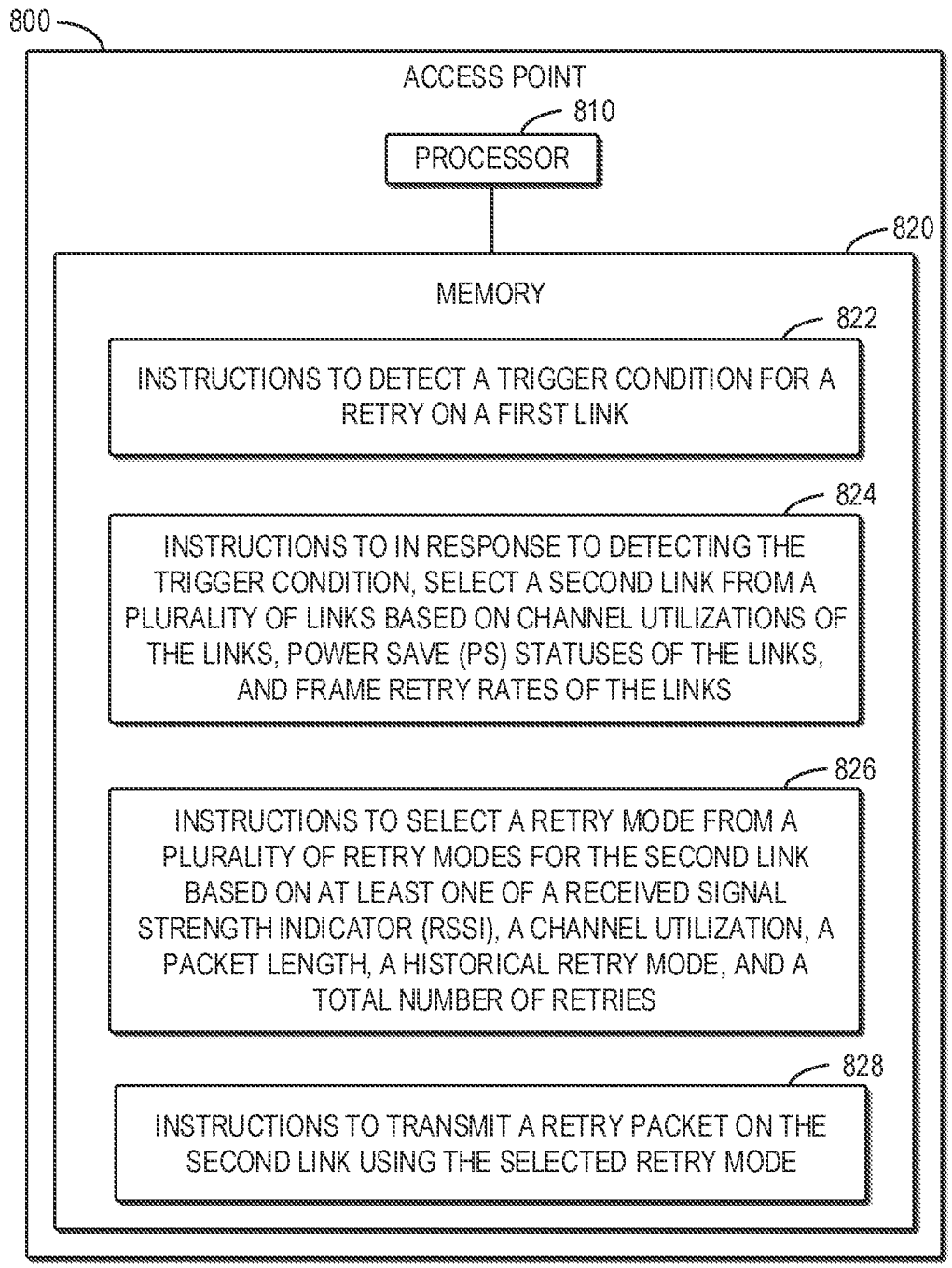
FIG. 8 illustrates an example access point multi-link device (AP MLD) according to implementations of the present disclosure.

Reference is made to FIG. 8, which illustrates an example access point multi-link device (AP MLD) 800 according to implementations of the present disclosure. As shown in FIG. 8, the AP MLD 800 comprises at least one processor 810, and a memory 820 coupled to the at least one processor 810. The memory 820 stores instructions 822, 824, 826, and 828 to cause the processor 810 to perform actions according to example implementations of the present disclosure. As shown in FIG. 8, the memory 820 stores instructions 822 to detect a trigger condition for a retry on a first link. The memory 820 further stores instructions 824 in response to detecting the trigger condition, and selects a second link from a plurality of links based on channel utilizations of the links, PS statuses of the links, and frame retry rates of the links.

The memory 820 further stores instructions 826 to select a retry mode from a plurality of retry modes for the second link based on at least one of an RSSI, a channel utilization, a packet length, a historical retry mode, and a total number of retries. The memory 820 further stores instructions 828 to transmit a retry packet on the second link using the selected retry mode. The stored instructions and the functions that the instructions may perform can be understood with reference to the description of FIGS. 2-7. For brevity, the details of instructions 822, 824, 826, and 828 will not be discussed herein.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, device, or any suitable combination of the foregoing. More specific examples of the machine-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   detecting, by an access point (AP) multi-link device (MLD), a trigger condition for a retry on a first link;
   in response to detecting the trigger condition, selecting, by the AP MLD, a second link from a plurality of links based on channel utilizations of the links, power save (PS) statuses of the links, and frame retry rates of the links;
   selecting, by the AP MLD, a retry mode from a plurality of retry modes for the second link based on at least one of a received signal strength indicator (RSSI), a channel utilization, a packet length, a historical retry mode, and a total number of retries; and
   transmitting, by the AP MLD, a retry packet on the second link using the selected retry mode.

2. The method of claim 1, wherein detecting the trigger condition for the retry on the first link comprises detecting at least one of the following:
   a possibility that a traffic on the first link transmitted to a station (STA) MLD being smaller than a first threshold;
   a retry mode associated with the first link on the STA MLD satisfying a preset condition; or
   a retry counter associated with the first link being greater than a second threshold.

3. The method of claim 1, wherein selecting the second link from the plurality of links is based on at least one of the following:
   a PS status on a first STA MLD of the second link being off;
   a channel utilization of the second link being minimum among the links; and
   a frame retry rate of the second link being minimum among the links.

4. The method of claim 3, further comprising:
   in response to determining that PS statuses of links on the first STA MLD are off, waking up, by the AP MLD, a second STA MLD with delivery traffic indication message (DTIM) or traffic indication message (TIM) indicated in beacon frames.

5. The method of claim 3, wherein transmitting the retry packet on the second link using the selected retry mode comprises:
   determining, by the AP MLD and based on a value of an MLD level of the first STA MLD, a third threshold;
   detecting, by the AP MLD, a number of retries on the first link being greater than the third threshold; and
   switching, by the AP MLD, the retry to the second link.

6. The method of claim 1, wherein selecting the retry mode from the plurality of retry modes for the second link comprises:
   obtaining, by the AP MLD, the at least one of the RSSI, the channel utilization, the packet length, the historical retry mode, and the total number of retries; and
   determining, by the AP MLD, the retry mode from the plurality of retry modes for the second link using a machine learning model, wherein the machine learning model is trained by a training dataset comprising at least one of historical RSSIs, historical channels utilizations, historical packets lengths, historical retries modes, and historical total numbers of retries.

7. The method of claim 1, wherein the first link is an uplink, and transmitting the retry packet on the second link using the selected retry mode comprises:
   detecting, by the AP MLD, a status of an upstream packet buffer of an STA MLD on the first link by at one least one of the following:
      triggering a buffer status report poll (BSRP) to the STA MLD; and
      receiving a buffer status report (BSR) from the STA MLD or checking a quality of service (QOS) filed from an uplink data packet;
   determining, by the AP MLD, that the trigger condition is triggered based on the status; and
   transmitting, by the AP MLD, the retry packet on the second link using the selected retry mode.

8. The method of claim 7, further comprising:
   determining, by the AP MLD, a retry mode for an STA MLD on the first link;
   gaining, by the AP MLD, a transmission opportunity (TXOP) for the STA MLD;
   allocating, by the AP MLD, a period of time within the TXOP to the STA MLD for a retry; and
   causing the STA MLD to retry a packet on an uplink within the period of time.

9. The method of claim 8, wherein allocating the period of time comprises:
   sending, by the AP MLD and to the STA MLD, a multi-user request to send (MU-RTS) TXOP Sharing (TXS) trigger frame.

10. The method of claim 1, wherein the plurality of retry modes comprise at least the following:
    a first retry mode in which a data frame retry is performed directly;
    a second retry mode in which a clear to send (CTS) frame is sent to the AP MLD and the channel is taken by the AP MLD, and then a data frame retry is performed;
    a third retry mode in which a request to send (RTS) frame is sent by the AP MLD, and a CTS frame is received to clear a channel on the link, wherein the RTS gains a data frame TXOP; and
    a fourth retry mode in which an RTS frame is sent by the AP MLD and a CTS frame is received to clear a channel, wherein the RTS does not gain a data frame TXOP.

11. The method of claim 1, further comprising:
    in response to determining that all packets in a presentation protocol data unit (PPDU) are failed, applying, by the AP MLD, the selected retry mode on the second link.

12. An access point (AP) multi-link device (MLD) comprising:
    at least one processor; and
    a memory coupled to the at least one processor, the memory storing instructions to cause the at least one processor to:
       detect a trigger condition for a retry on a first link;
       in response to detecting the trigger condition, select a second link from a plurality of links based on channel utilizations of the links, power save (PS) statuses of the links, and frame retry rates of the links;
       select a retry mode from a plurality of retry modes for the second link based on at least one of a received signal strength indicator (RSSI), a channel utilization, a packet length, a historical retry mode, and a total number of retries; and
       transmit a retry packet on the second link using the selected retry mode.

13. The AP MLD of claim 12, wherein the instructions to detect the trigger condition for the retry on the first link comprise instructions to cause the at least one processor to detect at least one of the following:
- a possibility that a traffic on the first link transmitted to a station (STA) MLD being smaller than a first threshold;
- a retry mode associated with the first link on the STA MLD satisfying a preset condition; or
- a retry counter associated with the first link being greater than a second threshold.

14. The AP MLD of claim 12, wherein selecting the second link from the plurality of links is based on at least one of the following:
- a PS status on a first STA MLD of the second link being off;
- a channel utilization of the second link being minimum among the links; and
- a frame retry rate of the second link being minimum among the links.

15. The AP MLD of claim 14, wherein the memory further storing instructions to cause the at least one processor to:
- in response to determining that PS statuses of links on the first STA MLD are off, wake up a second STA MLD with delivery traffic indication message (DTIM) or traffic indication message (TIM) indicated in beacon frames.

16. The AP MLD of claim 14, wherein the instructions to transmit the retry packet on the second link using the selected retry mode comprise instructions to cause the at least one processor to:
- determine a third threshold based on a value of an MLD level of the first STA MLD;
- detect a number of retries on the first link being greater than the third threshold; and
- switch the retry to the second link.

17. The AP MLD of claim 12, wherein the instructions to select the retry mode from the plurality of retry modes for the second link comprise instructions to cause the at least one processor to:
- obtain the at least one of the RSSI, the channel utilization, the packet length, the historical retry mode, and the total number of retries; and
- determine the retry mode from the plurality of retry modes for the second link using a machine learning model, wherein the machine learning model is trained by a training dataset comprising at least one of historical RSSIs, historical channels utilizations, historical packets lengths, historical retries modes, and historical total numbers of retries.

18. The AP MLD of claim 12, wherein the plurality of retry modes comprise at least the following:
- a first retry mode in which a data frame retry is performed directly;
- a second retry mode in which a clear to send (CTS) frame is sent to the AP MLD and the channel is taken by the AP MLD, and then a data frame retry is performed;
- a third retry mode in which a request to send (RTS) frame is sent by the AP MLD, and a CTS frame is received to clear a channel on the link, wherein the RTS gains a data frame TXOP; and
- a fourth retry mode in which an RTS frame is sent by the AP MLD and a CTS frame is received to clear a channel, wherein the RTS does not gain a data frame TXOP.

19. The AP MLD of claim 12, further comprising instructions to cause the at least one processor to:
- in response to determining that all packets in a presentation protocol data unit (PPDU) are failed, apply the selected retry mode on the second link.

20. A non-transitory computer-readable medium comprising instructions stored thereon which, when executed by an access point (AP) multi-link device (MLD), cause the AP MLD to:
- detect a trigger condition for a retry on a first link;
- in response to detecting the trigger condition, select a second link from a plurality of links based on channel utilizations of the links, power save (PS) statuses of the links, and frame retry rates of the links;
- select a retry mode from a plurality of retry modes for the second link based on at least one of a received signal strength indicator (RSSI), a channel utilization, a packet length, a historical retry mode, and a total number of retries; and
- transmit a retry packet on the second link using the selected retry mode.

* * * * *